United States Patent [19]

Bamberger et al.

[11] Patent Number: 4,659,241
[45] Date of Patent: Apr. 21, 1987

[54] ROLLING ELEMENT BEARING MEMBER

[75] Inventors: Eric N. Bamberger, Wyoming; John C. Clark, Jr., Oxford; Alexander H. Nahm, Madeira, all of Ohio

[73] Assignee: General Electric Company, Cincinnati, Ohio

[21] Appl. No.: 705,453

[22] Filed: Feb. 25, 1985

[51] Int. Cl.$^4$ ............................................. F16C 33/62
[52] U.S. Cl. .................................. 384/625; 384/492; 384/912
[58] Field of Search ............... 384/492, 490, 548, 912, 384/625; 308/241; 148/31.5, 39

[56] References Cited

U.S. PATENT DOCUMENTS

| 4,131,491 | 12/1978 | Joseph | 148/39 |
| 4,191,599 | 3/1980 | Stickels | 148/39 |
| 4,303,137 | 12/1981 | Fischer | 148/39 |

Primary Examiner—Lenard A. Footland
Attorney, Agent, or Firm—Lee H. Sachs; Derek P. Lawrence

[57] ABSTRACT

A rolling element bearing member designed for use in a preselected bearing operation, such as a gas turbine engine, which develops a predetermined operating hoop tensile stress in the member includes a hardened layer contiguous with a ductile core having a hardness less than 50 Rockwell C. For example, the hardened layer is a carburized layer of high hardness in the range of 58–66 Rockwell C. The hardened layer has improved resistance to crack initiation and propagation as a result of providing the layer with compressive residual stress in an amount greater than the predetermined operating hoop tensile stress, for example in the range of about 10–60 ksi to a depth up to about 0.06 inch. Such a member is made by providing a member of a metal alloy having the capability of developing such a hardened layer, and then processing the member to develop the layer in the amount of compression.

5 Claims, 6 Drawing Figures

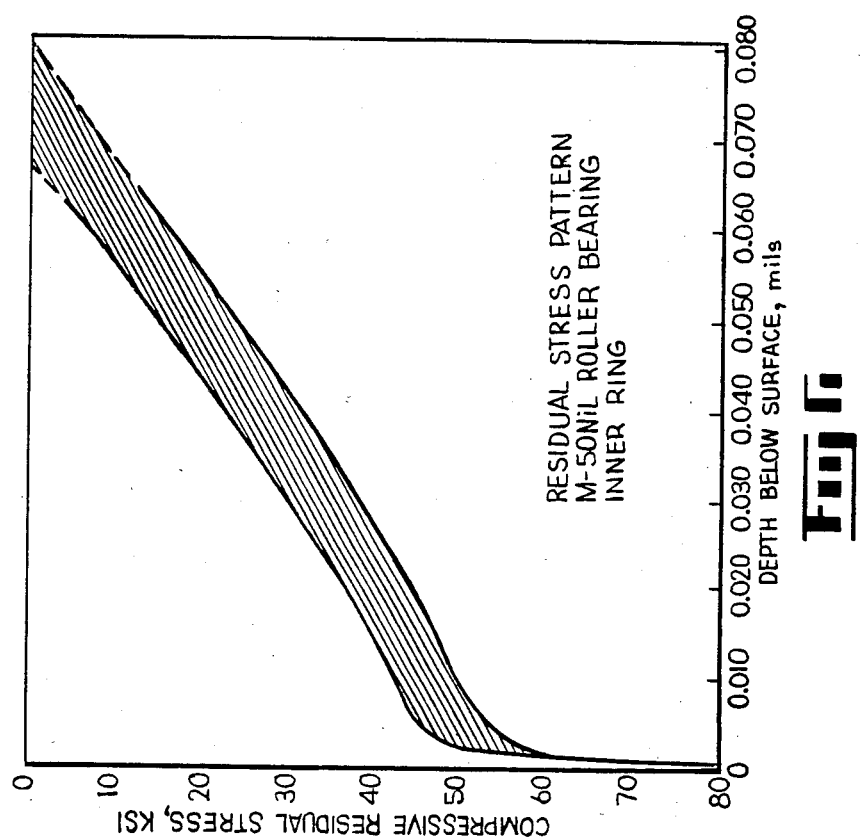
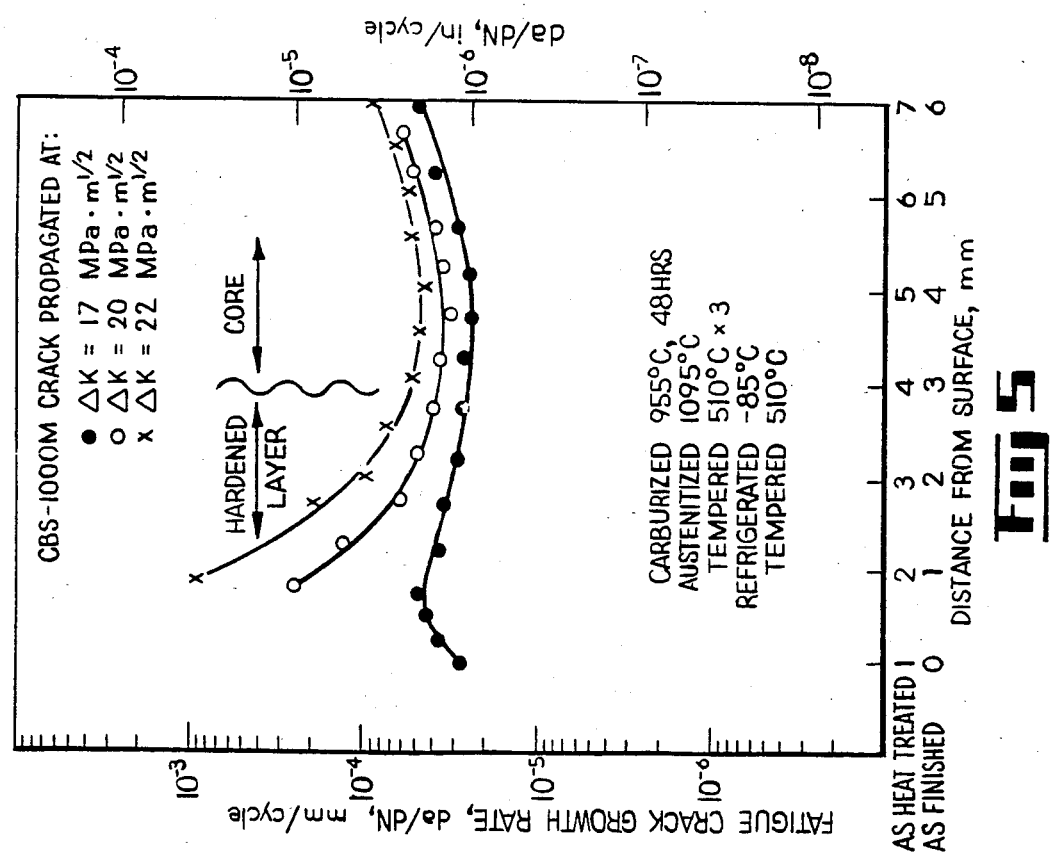

ROLLING ELEMENT BEARING MEMBER

BACKGROUND OF THE INVENTION

This invention relates to rolling element bearings and, more particularly, to high speed bearings of the type used in turbomachinery.

In general, bearings used in turbomachinery such as gas turbine engines must withstand environmental and operating conditions much more strenuous than do bearings found in many ordinary applications. As a result, special bearing steels were developed for turbomachinery and have performed well for many years. One of the most commonly used materials for bearings in gas turbine engines manufactured in the United States is a commercially available iron-base alloy identified as AISI M-50 for which there are published specifications AMS6490 and AMS 6491. Similar steels, though more highly alloyed, are used in European gas turbine engine manufacture, for example commercially available alloy T1 (18-4-1). Published data indicates little difference between these two materials in regard to rolling contact fatigue or fracture toughness.

Alloy M-50, which is a Cr-Mo-V high speed tool steel, has been used for about 25 years in bearings for both commercial and military aircraft gas turbine engines. However, with the development of higher speed, higher temperature advanced gas turbine engines, it has been recognized that a bearing member of improved life is required. In such advanced designs, operational conditions have placed new demands on bearings as a result of increase in engine speeds to achieve improved operating efficiency and lower fuel consumption. Such increases in engine speed results in an increase in the bearing DN (the bearing bore in millimeters times the shaft speed in revolutions per minute), and an increase in operating hoop tensile stress. As the tensile stress increases, the low fracture toughness, and more specifically the low stress intensity factor, of current through-hardened rolling element bearing materials becomes a technical barrier which can be critical to the operation of such advanced engines. The potential significant decrease in bearing reliability using current bearing materials has resulted in design limitations for such advanced engines. In addition, the higher stress levels in such engines are sufficient to cause race fractures following rolling contact fatigue initiated spalling failure, which may compromise engine integrity.

SUMMARY OF THE INVENTION

It is a principal object of the present invention to provide an improved rolling element bearing member having improved resistance to crack initiation and propagation.

Another object is to provide a bearing member with sufficient fracture toughness to prevent fracture of the member following spalling.

Still another object is to provide a method for providing an improved rolling element bearing member which inhibits the initiation and propagation of fatigue cracks in a carburized surface layer of the member.

A further object is to provide an improved method for operating a rolling element bearing member at very high stress levels.

These and other objects and advantages will be more fully understood from the following detailed description, the drawings and examples, all of which are intended to be typical of rather than in any way limiting on the scope of the present invention.

The present invention in one form provides an improved rolling element bearing member designed for use in a preselected bearing operation which develops a predetermined operating hoop tensile stress in the member, the member having a ductile core of a hardness less than about 50 Rockwell C and a hardened layer contiguous with the core. The hardened layer is provided with compressive residual stress in an amount greater than the predetermined operating hoop tensile stress, whereby the hardened layer maintains a condition of compressive residual stress during the entire preselected bearing operation.

In a more specific form, the present invention comprises a carburized and heat treatment hardened rolling element bearing member in which the ductile core is of a low carbon iron base alloy with a hardness in the range of less than 50 Rockwell C, and the hardened layer is of high hardness in the range of 58–66 Rockwell C, contiguous with the core. The member is provided with improved resistance to crack initiation and propagation as a result of compressive residual stress in the carburized layer, after carburizing and heat treatment, the stress being maintained during the entire bearing operation in the range of about 10–60 ksi to a depth of about 0.06 inch.

In another form of the present invention, a method is provided for making a bearing member which inhibits the initiation and propagation of fatigue cracks in a hardened, such as carburized, layer. The method comprises providing a metal alloy which has the capability of developing the hardened layer to be sufficiently in compression to maintain a condition of compression during the entire preselected bearing operation. For example, hardening can be accomplished by carburizing and heat treatment under preselected conditions. The metal alloy is processed to develop the hardened layer having the required compressive stress, for example by carburizing under such preselected conditions and then heat treating to develop the carburized layer in compression in the range of about 10–60 ksi at a depth from the surface in the range of about 0.06 inch.

Another form of the present invention provides, in a method for operating a rolling element bearing member comprising a ductile core of a hardness less than 50 Rockwell C and a hardened layer contiguous with the core, the step of maintaining the hardened layer under compressive stress during the entire operation of the bearing member.

BRIEF DESCRIPTION OF THE DRAWING

FIG. 5 is a graphical presentation of CBS-1000M alloy fatigue crack growth data.

FIG. 6 is a graphical presentation of a residual stress pattern in an M-50NiL alloy roller bearing inner ring member.

DESCRIPTION OF THE PREFERRED EMBODIMENTS

Figure 2:
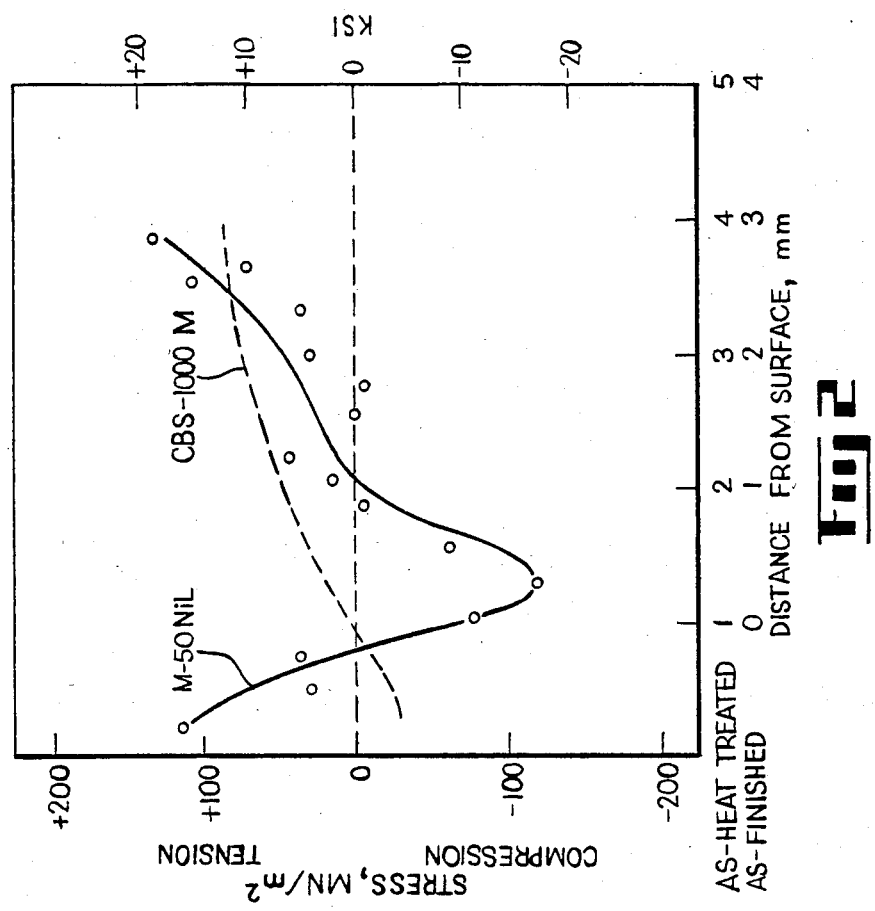
FIG. 2 is a graphical comparison of residual stress data.

A rolling element bearing member suitable for high speed rolling element bearing operation, for example up to 2–3 million DN, must be capable of safely sustaining the combined high tangential tensile stress and compressive stresses due to contact without experiencing fracture-type failures. Generally, the type of bearing members which experience contact stress include rings, balls, and rollers, with the rings being the element which usually experiences tension contact stress.

Bearing life is calculated on the basis of hours or stress cycles to failure. As bearing DN increases, two events occur affecting the life and reliability of the bearing: (1) the number of stress cycles in a given time period increases and the life in hours is reduced; and (2) an increased hoop tensile stress is imparted to the bearing element rotating at very high speeds. These types of problems become even more serious in small gas turbine engines in which bearings are used at much higher speeds, with increased cycles per hour.

Coupled with such a reduction in bearing life is the change in failure mode as speeds reach into the DN range of about $2.4 \times 10^6$: the failure mode changes from spalling fatigue to race fracture. Although spalling fatigue is undesirable, its presence can be detected by various diagnostic tools. However race fracture is an unacceptable failure mode because it can occur without warning and can cause extensive secondary damage to the entire engine system.

The current widely used bearing material M-50 alloy has been improved over the years, resulting in bearings of relatively low failure rate in current production gas turbine engines designed for aircraft applications. Typical aircraft gas turbine engine bearings are described in such U.S. Patents as U.S. Pat. No. 3,572,054—Hemsworth, issued Sept. 8, 1970; U.S. Pat. No. 4,214,796—Monzel et al, issued July 29, 1980; U.S. Pat. No. and 4,289,360—Zirin, issued Sept. 15, 1981. The disclosures of these patents are hereby incorporated herein by reference. However, advanced designs of such gas turbine engines have identified a need for bearings having improved resistance to crack initiation and propagation, for example as a result of rolling life contact fatigue improvements in combination with improvement in fracture toughness of the material of construction.

During the evaluation of the present invention, M-50 alloy steel was studied along with other alloys steels having comparable temperature capability. The principal special bearing steel materials evaluated in connection with the present invention, along with their chemical compositions, are shown in the following Table I:

TABLE I

| Steel | Chemical Compositions (wt %-Balance Fe and incidental impurities) | | | | |
|---|---|---|---|---|---|
| | C | Mo | Cr | V | Ni |
| M-50NiL | .11–.15 | 4.0–4.5 | 4.0–4.25 | 1.1–1.3 | 3.2–3.6 |
| CBS-1000M | .10–.16 | 4.0–5.0 | 0.90–1.20 | .25–.50 | 2.75–3.25 |
| M-50 | .80–.85 | 4.0–4.5 | 4.0–4.25 | .90–1.10 | — |

All of the materials listed in Table I are of the Cr-Mo-V type steel, with Ni being added to the alloys identified as M-50NiL and CBS-1000M.

During this evaluation, standard through-hardened M-50 alloy was compared with carburized M-50NiL in a rolling contact fatigue test rig of the type described in U.S. Pat. No. 3,053,073—Baughman, issued Sept. 11, 1962, the disclosure of which is incorporated herein by reference. As shown in the graphical presentation of FIG. 1, M-50NiL alloy possesses at least double the rolling contact fatigue life of M-50 alloy under the test conditions shown.

It has been observed during such evaluation that residual stresses play a significant role in crack initiation and propagation.

The data in the following Table II show the significant difference in effect of high hoop tensile stress on bearing life between the two materials. The tests were conducted at a very high hoop tensile stress of about 50 ksi and high Hertzian stress of about 300 ksi at a temperature of about 250° F. and 7300 rpm. The M-50NiL article was treated to produce the residual compression range of conditions of the type shown in FIG. 6. The through-hardened M-50, which was under residual tension during the test, failed at less than 500 hours. The tests were suspended with no distress after 2000 and 3000 hours for the rings of carburized M-50NiL material including a ductile core of 45 Rockwell C and a curburized hardened layer of 62 Rockwell C. The M-50NiL VIM-VAR material was carburized at 955° C. for 48 hours and then heat treated to harden by austenitizing at 1095° C. and tempered five times at 525° C. The M-50 was a vacuum induction melted-vacuum arc remelted (VIM-VAR) material which was through-hardened to 62 Rockwell C by austenitizing at 1095° C. and tempering five times at 525° C.

TABLE II

Effect of High Hoop Tensile Stress on Bearing Life (outer ring of M-50 alloy)

| Inner Ring Material | Test Time (Hours) | Inner Ring Observations |
|---|---|---|
| M-50 | 419 | 24 Axial Cracks, 2 Spalls |
| M-50 | 239 | 10 Axial Cracks, 2 Spalls |
| M-50NiL | 2000 | Suspended - No Distress |

Figure 1:
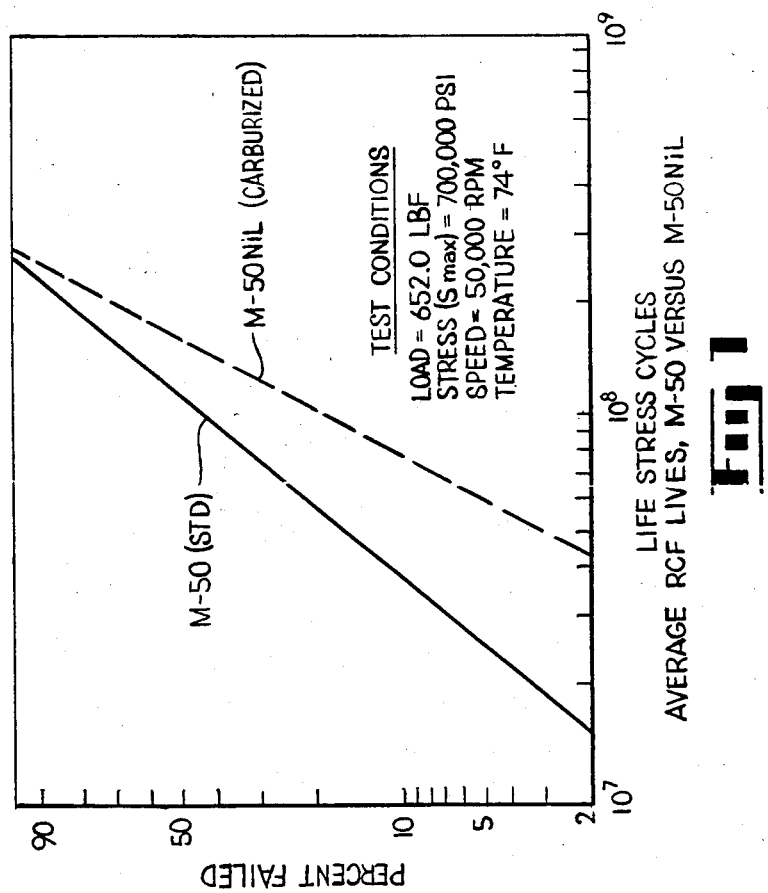
FIG. 1 is a graphical comparison of rolling contact fatigue lives.

Because of the signiicant difference between the mechanical properties of the two materials shown in FIG. 1 and in Table II, the evaluation of the present invention included the comparison of M-50NiL material with other carburizing materials of similar chemical compositions, such as CBS-1000M alloy the composition of which is shown in Table I. Like M-50NiL, CBS-1000M is a Cr-Mo-V steel which includes Ni as an alloying element. The composition of such two materials are not too dissimilar and they both are carburizing materials. Nevertheless, the evaluation of the present invention disclosed that, in a carburized and heat treatment hardened rolling element bearing member, they exhibit remarkably and unexpectedly different stress patterns. These patterns are shown graphically in FIG. 2 for bearing members processed as described above for the materials identified. Approximately one millimeter of the surfaces of the members were removed by finish machining prior to testing, to correspond with ordinary manufacturing techniques. For purposes of a full comparison of properties, including those in the outer one millimeter thus removed, FIG. 2 and subsequent FIGS. 3, 4, and 5 include data for both portions. The two materials were carburized and then austenitized with the CBS-1000M being tempered at 510° C., refrigerated at −85° C. and then tempered twice at 510° C. The M-50NiL material was tempered five times at 510° C. As graphically shown in FIG. 2, the M-50NiL material is under compression from the finish machined surface to a depth, toward the core, of about 1 millimeter (about 0.04 inch) whereas the CBS-1000M material is under tension from the finish machined surface of the carburized case inwardly toward the core.

Figure 3:
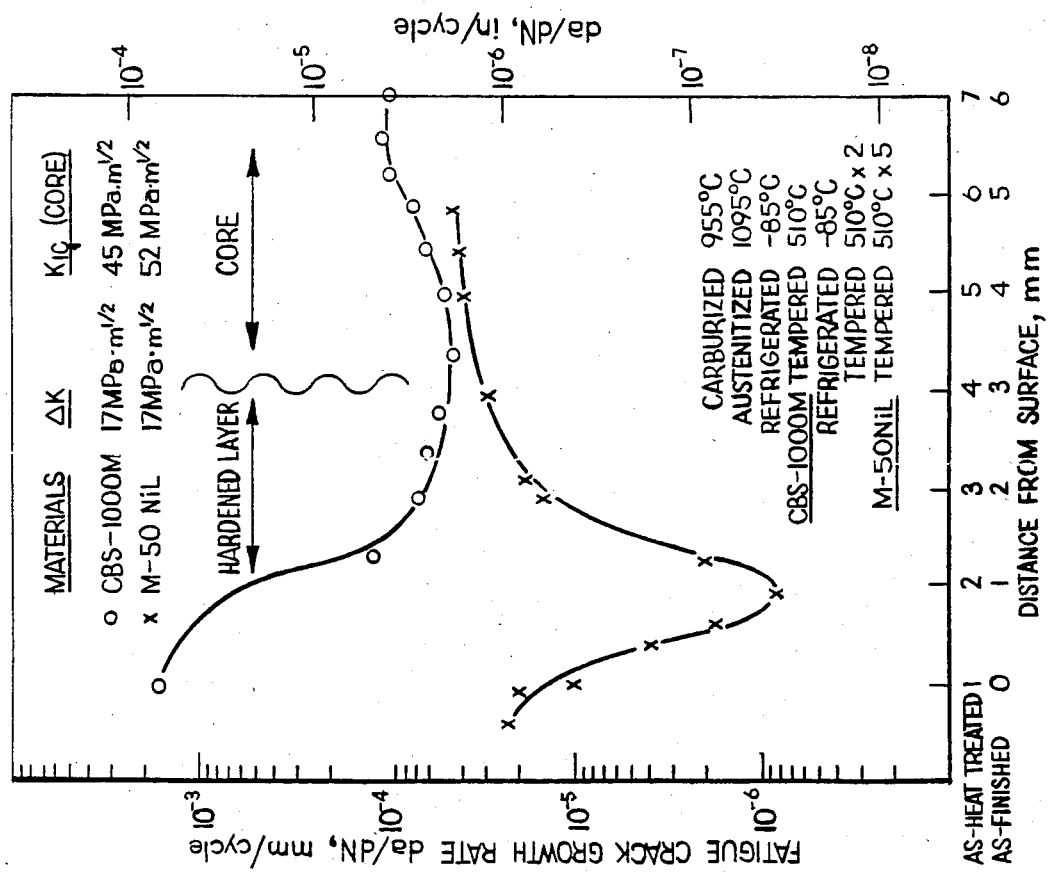
FIG. 3 is a graphical comparison of fatigue crack growth data.

The compressive residual stresses in the carburized case of M-50NiL significantly inhibited the initiation and propagation of fatigue cracks in the carburized case. The data developed in the evaluation of the present invention is compared in the graphical presentation of FIG. 3 for these same two materials and under the conditions shown. In FIG. 3 and in subsequent figures, the terms shown have the following meanings:

ΔK means cyclic stress intensity factor range in $K_{SI} \cdot \sqrt{in}$ $K_{Ic}$ means critical stress intensity factor (ksi/$\sqrt{in}$)

MPa·m$^{\frac{1}{2}}$ is the metric unit of $K_{SI} \cdot \sqrt{in}$ da/dN means crack growth rate (length/cycle)

Figure 4:
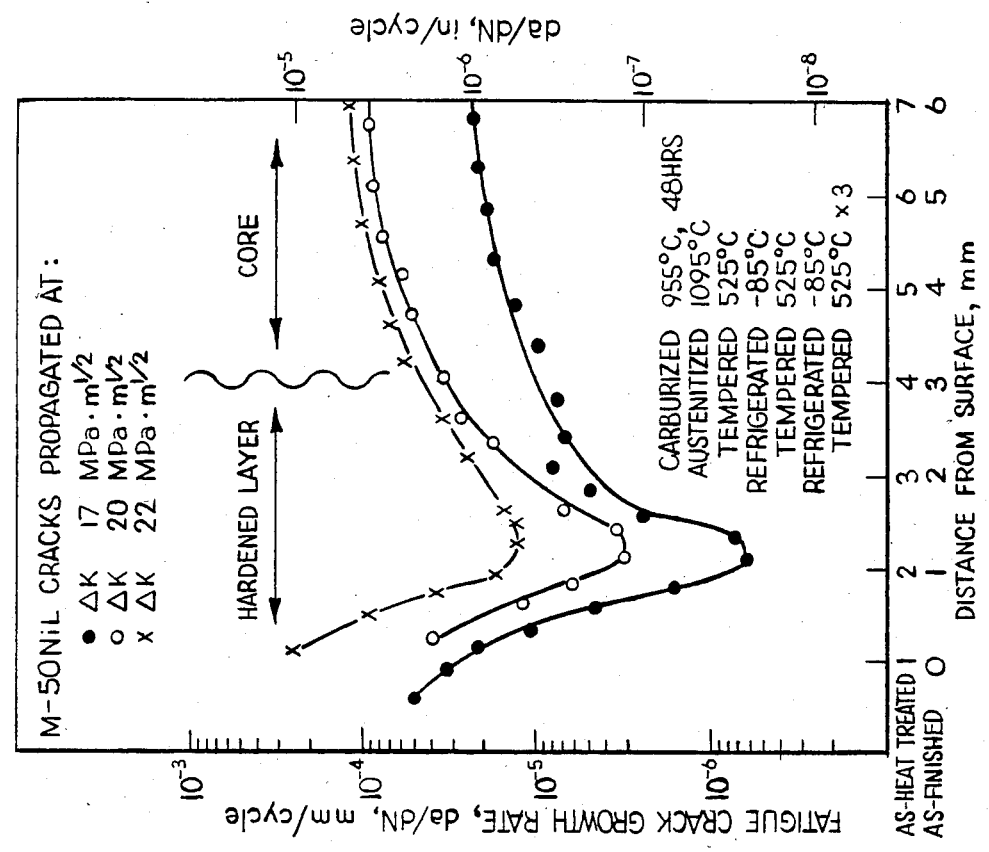
FIG. 4 is a graphical presentation of M-50NiL alloy fatigue crack growth data.

FIGS. 4 and 5 present crack growth data respectively M-50NiL and CBS-1000M material at different values of ΔK to show the consistency in the form of the data.

Although current M-50 alloy roller bearings are through-hardened, it was found during the evaluation of the present invention that carburizing produced better carbide size and distribution in M-50NiL and CBS-1000M type alloy than is found in conventionally produced high carbon alloy portions of this type. Carburizing is a process well known and widely used in the metallurgical art. The type of carburizing used in the evaluation and processing of the present invention is of the type described in an article "Vacuum Carburizing" by William J. Doelker, *METAL PROGRESS*, May 1977, the disclosure of which is hereby incorporated herein by reference.

In the course of the evaluation of the present invention, fatigue crack propagation rates were measured through a case-core path, as shown in the drawings, at constant values of ΔK. These data illustrate the profound effect of the type of residual stresses on crack propagation rates. It shows clearly that the structure of the carburized case is very important and that the residual stress patterns and retained austenite contents can be significant factors in the choice of the material for manufacture of the improved carburized and heat treatment hardened rolling element bearing member of the present invention. For example, M-50NiL has a very low level (less than 5%) of retained austenite, which is better than can be achieved with most carburizing grades of steel.

The data show that a rolling element bearing member, for example of a material which has the mechanical properties of M-50NiL, with the carburized case under appropriate residual compressive stress during the entire period of operation can provide a good combination of high fracture toughness and a low rate of fatigue crack propagation. A crack which starts in the hardened layer or case is slowed substantially by the residual compressive stresses generated by the hardening which is used in providing the member. After the crack reaches the core, it proceeds at the rate predicted from the core properties, and the full fracture toughness of the core comes into play.

The present invention provides, in the member, enhanced fatigue properties in the hardened case along with fracture toughness in the core sufficient to stop cracks from propagating under relatively high hoop tensile stresses experienced by bearing members in advanced gas turbine engines for aircraft applications. According to the present invention, it was recognized unexpectedly that the two materials M-50NiL and CBS-1000M, having comparable chemical compositions and substantially equivalent fracture toughness in the core, can, after processing, provide such different residual stresses in the carburized cases: the compressive stresses in M-50NiL providing resistance to crack initiation and propagation and the tension stresses in the CBS-1000M failing to provide such failure protection.

Additional evaluation of the member of the present invention involved component tests. A 0.300 inch thick roller bearing inner ring of M-50NiL alloy was carburized to achieve a 0.040 inch hardened case depth. Case depth in this example is defined as the depth to a hardness of about 58 Rockwell C below the surface. After full treatment as described above, the machined inner ring maintained a high level of residual compressives stress at least to a depth of about 0.06 inch, and below, in the carburized case, as shown in FIG. 6.

Thus according to the present invention, there is provided an improved carburized and heat treatment hardened roller element bearing member which has high surface hardness to provide good rolling contact fatigue life along with a ductile core to provide high fracture toughness which retards crack growth and prevents race fracture. Significant improvement in the member results from a high level of compressive residual stress in the hardened surface layer to inhibit crack initiation and retard growth of any crack by effectively reducing the stress intensity below or near the threshold value. In addition, by judicious selection of a material, such as M-50NiL alloy, which can be processed to provide such compressive residual stresses, a high temperature capability can be provided, as required for operation in advanced gas turbine engines. Although the present invention has been described in connection with specific examples and embodiments, it will be readily understood by those skilled in the art, particularly the metallurgical art related to bearing materials and processing, that the present invention is capable of variations and modifications without departing from the invention's scope represented by the appended claims.

What is claimed is:

1. A rolling element bearing member for cooperation with a shaft rotating at a preselected speed, the member having a ductile core of a hardness less than 50 Rockwell C had a hardened layer contiguous with the core, wherein:

the member is construction to have a bearing bore in millimeters which, when multiplied by the speed, in revolutions per minute, of the shaft in a preselected bearing operation above a spalling fatigue mode and in a fracture failure mode, equals at least about 2.4 million (DN), the preselected bearing operation developing a predetermined operating hoop tensile stress in the member;

the hardened layer has a compressive residual stress greater than the predetermined operating hoop tensile stress whereby the hardened layer maintains a condition of compressive residual stress during the entire preselected bearing operation and whereby the member has improved resistance to crack initiation and propagation during the preselected operation; and the member is constructed of an alloy capable of developing and retaining the hardened layer at least at the compressive residual stress.

2. The bearing member of claim 1 of an iron base alloy, for use in gas turbine engine operation comprising:

a low carbon ductile core having a hardness in the range of less than 50 Rockwell C;

a carburized hardened layer of high hardness in the range of 58–66 Rockwell C contiguous with the core;

the member being provided with improved resistance to crack initiation and propagation at a bearing DN of at least about 2.4 million as a result of compressive residual stress in the curburized layer, after carburizing and heat treatment, in the range of about 10–60 ksi to a depth of about 0.06 inch.

3. The bearing member of claim 2 in which the hardened layer is a carburized and heat treatment hardened layer including retained austenite in the amount of no greater than about 6 weight %.

4. The bearing member of claim 3 constructed of M-50NiL alloy.

5. In a method for operating the rolling element bearing member of claim 1, comprising the ductile core and the hardened layer, in a preselected bearing operation which develops a predetermined operating hoop tensile stress in the member at a DN of at least about 2.4 million above a spalling fatigue mode and in a fracture failure mode of the member, the step of maintaining the hardened layer under compressive stress during the entire operation of the member whereby the member has improved resistance to crack initiation and propagation.

* * * * *

UNITED STATES PATENT AND TRADEMARK OFFICE
CERTIFICATE OF CORRECTION

PATENT NO. : 4,659,241

DATED : April 21, 1987

INVENTOR(S) : Eric N. Bamberger, et al

It is certified that error appears in the above-identified patent and that said Letters Patent is hereby corrected as shown below:

Column 6, line 45, "had" should read -- and --.

Column 7, line 10, "curburized" should read -- carburized --.

Signed and Sealed this

First Day of March, 1988

Attest:

DONALD J. QUIGG

Attesting Officer

Commissioner of Patents and Trademarks